(12) United States Patent
Bettin

(10) Patent No.: US 9,132,883 B2
(45) Date of Patent: Sep. 15, 2015

(54) REAR-WHEEL DRIVE

(76) Inventor: Karsten Bettin, Hannover (DE)

( * ) Notice: Subject to any disclaimer, the term of this patent is extended or adjusted under 35 U.S.C. 154(b) by 0 days.

(21) Appl. No.: 14/129,985

(22) PCT Filed: Jul. 7, 2012

(86) PCT No.: PCT/DE2012/100207
§ 371 (c)(1),
(2), (4) Date: Dec. 29, 2013

(87) PCT Pub. No.: WO2013/007253
PCT Pub. Date: Jan. 17, 2013

(65) Prior Publication Data
US 2014/0274519 A1    Sep. 18, 2014

(30) Foreign Application Priority Data

Jul. 14, 2011   (DE) .......................... 10 2011 051 850

(51) Int. Cl.
*F16D 23/00* (2006.01)
*B62M 9/00* (2006.01)
*B62K 25/00* (2006.01)

(52) U.S. Cl.
CPC ............... *B62M 9/00* (2013.01); *B62K 25/005* (2013.01)

(58) Field of Classification Search
CPC ............................... B62M 9/00; B62K 25/005
USPC ................. 192/64, 46, 69.81, 45.1, 31, 41 R, 192/45.001, 30 R; 301/124.2, 79, 110.5
See application file for complete search history.

(56) References Cited

U.S. PATENT DOCUMENTS

| | | | | |
|---|---|---|---|---|
| 4,674,617 A * | 6/1987 | Nagano | ..................... | 192/113.32 |
| 6,123,179 A | 9/2000 | Chen | | |
| 6,374,975 B1 * | 4/2002 | Schlanger | ........................ | 192/64 |
| 7,434,892 B2 * | 10/2008 | Mercat et al. | ............... | 301/124.2 |
| 7,938,241 B1 * | 5/2011 | Chen | ............................... | 192/64 |
| 8,047,956 B2 | 11/2011 | Frank | | |
| 8,485,335 B2 * | 7/2013 | Schlanger | ........................ | 192/64 |
| 2002/0139631 A1 * | 10/2002 | Wang | .............................. | 192/64 |
| 2006/0108858 A1 | 5/2006 | Mercat et al. | | |
| 2006/0108859 A1 | 5/2006 | Mercat et al. | | |
| 2011/0084544 A1 | 4/2011 | Thorpe | | |

FOREIGN PATENT DOCUMENTS

BE     558090 A     6/1957
DE     10127614 A1  12/2002
(Continued)

*Primary Examiner* — David J Hlavka
(74) *Attorney, Agent, or Firm* — Smartpat PLC; Axel Nix

(57) ABSTRACT

A rear-wheel drive for a bicycle or a trailer bike comprises an output sprocket of a chain drive, a rear-wheel shaft, and a driving mechanism being supported outside to the bicycle frame. The rear-wheel shaft is supported only on one side of the driving in a supporting manner relative to the bicycle frame. The driving mechanism on the side facing the bicycle frame is not, as commonly known, supported relative to the rear wheel shaft but relative to the bicycle frame. That creates the required space for arranging a freewheel clutch, that fulfills the strength requirements for transmitting the occurring torques even when using sprockets with only a few teeth. Thus, short distances between the rear wheel and the bottom bracket and single-arm suspensions in the bicycle frame can be implemented together with the implementation of suitable developments of the chain drive for small running wheels.

16 Claims, 13 Drawing Sheets

(56) References Cited

FOREIGN PATENT DOCUMENTS

| | | |
|---|---|---|
| DE | 202006010301 | 9/2006 |
| DE | 102007012535 A1 | 9/2008 |
| JP | 11321768 A | 11/1999 |
| JP | 2003054479 A | 2/2003 |
| JP | 2005289283 A | 10/2005 |
| WO | 2011/031113 | 3/2011 |

* cited by examiner

Detail A

Detail A

REAR-WHEEL DRIVE

TECHNICAL FIELD

The disclosure relates to a rear-wheel drive for a bicycle or a trailer bike, in particular for use with small running wheels.

BACKGROUND

Bicycles are preferably driven by means of a chain drive. Commonly the drive chain wheel connected to the crank arm lies predominantly outside the bicycle frame, while the output sprocket that is mounted on the rear-wheel axle is predominantly arranged inside the bicycle frame between the bicycle frame and the rear wheel.

Bicycles having smaller running wheels are preferably used so as to achieve small packing dimensions and weights, often designed as folding bicycles. Bicycles having 14 inch running wheels and less require a gear ratio of at least 1:5 between pedaling frequency and running-wheel frequency to be usable.

Trailer bikes are attached to the rear of a bicycle and, in contrast to those bicycles to which they are attached, mostly exhibit much smaller running wheels. Up till now, mostly transmissions having similar gear ratios are used for these running wheels as for the bicycles themselves. Thus the person riding the trailer bike has to ride at much higher pedaling frequencies than the person on the bicycle to which the trailer bike is attached. Even trailer bikes having small running wheels require the gear ratios mentioned above between the pedaling frequency and the running-wheel frequency.

So that the gear ratios that have been mentioned can be achieved with a single-stage chain drive, an output sprocket having as few teeth as possible has to be used. All tooth counts that have been mentioned below in this document, of the output sprockets and drive chain wheels refer to the chain pitch of 12.7 mm that is conventional for bicycle chains.

In the following solutions, output sprockets having low tooth counts are used:

a. In most cases the output sprocket is arranged between the bicycle frame and the rear wheel, the output sprocket being supported on a rear-wheel axle that is firmly connected to the bicycle frame. This solution has the disadvantage that on account of the strength requirements on the rear-wheel axle resulting from the bending loads, this axle must exhibit across its entire length a minimum diameter, on which the output sprocket is mounted, as a result of which the tooth count of the output sprocket amounts to at least nine teeth. This solution also has the disadvantage that the required freewheel has to be arranged in the rear-wheel hub or on the bottom bracket. JP 2003-054 479 A discloses a chain drive with an output sprocket having only eight teeth. Here it is a disadvantage that, on account of the system, no freewheel clutch is provided on the rear wheel. It would then have to be disposed between the crank arm and the drive chain wheel, seen in the power flow.

b. JP 11-321 768 A discloses a chain drive that uses an output sprocket that is arranged outside the bicycle frame and exhibits only seven teeth. A disadvantage of this solution is that the output sprocket exhibits an outer thread that is screwed directly to the rear-wheel shaft and that a freewheel clutch is arranged between the bottom bracket and the drive chain wheel, as a result of which no commercially available drive chain wheel directly connected to a crank arm can be used and as a result of which the output sprocket, the drive chain wheel, and the chain co-rotate in the freewheel case.

c. DE 101 27 614 A1 discloses a chain drive having an output sprocket of fewer than eleven teeth respectively having seven teeth. It is a disadvantage that the rear wheel is rotationally engaged with the chain and no freewheel clutch is provided.

d. JP 2005-289 283 A discloses a one-armed rear-wheel suspension on the bicycle frame, the output sprockets of the chain drive being mounted on both sides in the bicycle frame that has been designed as the gear case, and the rear wheel being arranged outside the gear case on one side of the bicycle frame. A freewheel clutch is arranged between the output sprockets and the rear-wheel shaft. So that a chain line distance that is conventional for bicycles is achieved for the bicycle drive, seen axially, the bicycle frame is designed between the output sprockets and the rear wheel as a thin-walled gear case. The consequence is that, seen axially, the rear-wheel shaft and the bottom-bracket shaft have to be mounted on both sides of the output sprocket respectively of the drive chain wheel relative to the gear case, in order to achieve the required stiffness between the rear-wheel shaft and the gear case respectively between the bottom-bracket shaft and the gear case. It is a disadvantage that in the process the rear-wheel shaft has to absorb, in the area of the freewheel clutch, the bending moments that are introduced from the rear wheel and are caused by the weight, and has to exhibit a minimum diameter that complies with the strength requirements and that in the process the smallest output sprocket of the sprocket assembly exhibits at least 13 teeth. It is further a disadvantage that on account of the fact that the rear-wheel shaft and the drive chain wheel are mounted in a supporting gear case on both sides, no commercially available drive chain wheel that is directly connected to a crank arm, can be used.

US 2006/0 108 858 A1, US 2006/0 108 859 A1 and BE 558 090 A reveal rear-wheel drives where a bearing supports a rear-wheel shaft relative to the frame and, seen in the power flow, a freewheel is arranged between a driving mechanism and the rear-wheel shaft, the freewheel being installed as a complete unit on the rear-wheel shaft. The freewheel comprises a freewheel clutch and bearing that supports the driving mechanism on the rear-wheel shaft.

A disadvantage of these embodiments is the fact that the bearings of the freewheel support the driving mechanism in each case relative to the rear-wheel shaft and, seen radially, are thus arranged between the driving mechanism and the rear-wheel shaft. On account of the design, the freewheel mechanism arranged between these bearings can thus again, seen radially, be implemented only between the sprockets of the driving mechanism and the rear-wheel shaft. In addition, the complete freewheel unit is connected to the rear-wheel shaft using a shaft-hub-connection. The radial installation space required for these elements in the area of the bearings, of the freewheel clutch and of the shaft-hub-connection probably does not permit an implementation of a driving mechanism having an output sprocket of fewer than 11 teeth in this area on account of the strength that is required for bicycles. It is in particular the bearing, which supports the driving mechanism, that is responsible for these disadvantages that, seen axially, is arranged between the freewheel mechanism and the bearing that supports the rear-wheel shaft relative to the frame. This bearing prevents an output sprocket having a lower tooth count and an acceptable chain line distance being implemented on the driving mechanism.

SUMMARY

The present disclosure provides an improved rear-wheel drive for bicycles or for trailer bikes, having at least one output sprocket that is driven by a chain drive, the output sprocket comprising a freewheel clutch arranged between a driving mechanism and a rear-wheel shaft and the output sprocket still having the lowest possible tooth counts and the rear-wheel drive making it possible to use a commercially available drive chain wheel that is directly connected to a crank arm. In combination with the drive chain wheel it shall be possible that the ratio of the tooth counts of output sprockets and drive chain wheel amounts to 1:5 or less so that a low total gear ratio can be achieved that is suitable for small running wheels.

Since, as a result of the arrangement of the output sprocket on the side of the bicycle frame opposite the rear wheel, the rear-wheel shaft only has to transmit torque and no loads in the area of the freewheel clutch due to weight, the rear-wheel shaft can exhibit markedly reduced diameters in the area of the output sprocket, as a result of which, seen in the power flow, a freewheel clutch can be realized between the output sprocket and the rear-wheel shaft and the output sprocket can exhibit very low tooth counts of less than 13 teeth down to 6 teeth.

Further advantages of the present disclosure are:

a. Rear-wheel drive variants for one-armed suspension in the bicycle frame and also variants for the suspension, provided on both sides of the rear wheel, can be implemented in the bicycle frame.

b. The rear-wheel drive can be used in particular for bicycles having small running-wheel sizes of 8 up to 14 inch on account of gear ratios of the chain drive that can be achieved, and in the process very short axle distances can be realized between the bottom-bracket axle and the rear-wheel shaft, so as to achieve small folding dimensions for example for folding bicycles.

c. A freewheel clutch does not have to be provided, neither inside the running wheel nor on the crank arm, on account of the freewheel clutch arranged between the driving mechanism and the rear-wheel shaft, as a result of which different shapes of running wheels can be used and can be firmly connected to the rear-wheel drive and as a result of which the same rear-wheel drive can be adapted to different running wheel sizes with the same achievable development, in exchanging the drive chain wheel of the chain drive.

d. Ergonomically favorable chainline distances can be achieved that can amount to less than 40 mm on account of the transmission components that have been implemented in a particularly space-saving manner.

DETAILED DESCRIPTION

Figure 1:
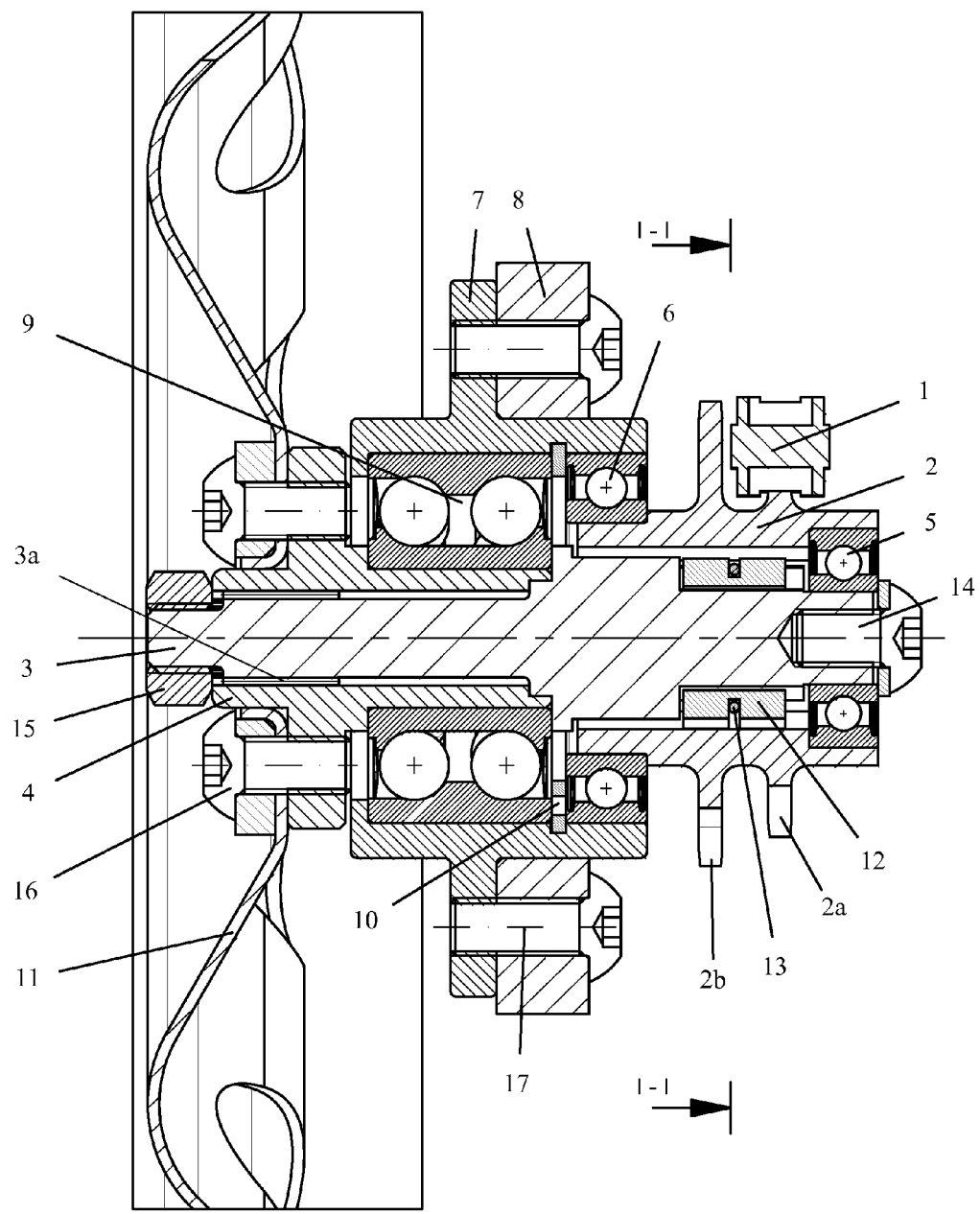
FIG. 1 shows the sectional view of a first embodiment of a rear-wheel drive in a one-armed suspension in the bicycle frame having a driving mechanism that comprises two output sprockets with 8 respectively 9 teeth, a pawl-freewheel clutch and a two-part rear-wheel shaft.

FIG. 1 shows a first embodiment of a rear-wheel drive in a one-armed suspension in the bicycle frame.

A driving mechanism 2 is driven by a chain 1 and comprises two output sprockets 2a and 2b of an endless chain drive. Driving mechanism 2 is mounted on its one side inside via a first drive mechanism bearing 5 on a rear-wheel shaft, that in this embodiment is designed as a two-part rear-wheel shaft comprising a drive shaft 3 and an output shaft 4, and on its other side outside via a second drive mechanism bearing 6 in a bearing bushing 7.

The bearing bushing 7 is connected firmly or releasably to a bicycle frame 8. The bearing bushing 7 receives a two-row rear-wheel shaft bearing 9, preferably an angular contact ball bearing, that in turn, supports the output shaft 4 of the rear-wheel shaft on the inside. The angular contact ball bearing is fixed axially in the bearing bushing 7 by a retaining ring 10. A rear wheel 11 is fastened on the output shaft 4. The drive shaft 3 of the rear-wheel shaft is operatively co-rotatingly connected with the output shaft 4 of the rear-wheel shaft by a splined shaft 3a. A threaded connection or similar can likewise be implemented.

An arrangement is likewise possible of two adjacent bearings for supporting the rear-wheel shaft in the bicycle frame that is connected to the bearing bushing 7, or also a support of the rear-wheel shaft that takes place on both sides of the rear wheel 11. So that the drive shaft 3 of the rear-wheel shaft is not exposed to any bending moments that are caused by impact and no bending moments that are essentially caused by weight, the rear-wheel shaft is supported, seen axially, only on one side of the driving mechanism in a supporting manner to the bicycle frame 8. This enables the implementation of a freewheel clutch that is particularly space saving and seen in the power flow is arranged between the driving mechanism 2 and the rear-wheel shaft, as a result of which particularly small output sprockets 2a and 2b can be realized on the driving mechanism 2.

Between the driving mechanism 2 and the drive shaft 3 of the rear-wheel shaft a pawl freewheel consisting at least of one pawl 12 and a spring ring 13 may be arranged. As illustrated in FIG. 1 the first drive mechanism bearing 5 exhibits a smaller inner diameter than the inner diameter of the recesses, provided on the drive shaft 3 of the rear-wheel shaft, for the pawls 12, as a result of which these recesses can be milled on the end face.

The axial definition of the drive mechanism bearing 5 and 6 is carried out using a screw 14 that is screwed into the drive shaft 3 of the rear-wheel shaft and braces the first drive mechanism bearing 5 against the driving mechanism 2 and the latter against the second drive mechanism bearing 6 and the latter against the retaining ring 10. It is also possible to use a nut instead of the screw 14. In this case, the drive shaft 3 of the rear-wheel shaft would have to exhibit a corresponding outer thread. These and further possible embodiments (for example having retaining rings) of the axial definition of the drive mechanism bearings 5 and 6 can be imagined.

It is also possible to dispense with the retaining ring 10, the screw 14 then bracing the second drive mechanism bearing 6 directly against the angular contact ball bearing 9 via the first drive mechanism bearing 5 and the driving mechanism 2.

A nut 15 locks the output shaft 4 of the rear-wheel shaft against the drive shaft 3. In this exemplary embodiment, the output shaft 4 of the rear-wheel shaft is designed as a rear-wheel flange and exhibits at least three, preferably four or five nut threads on the circumference, to which the rear wheel 11 can be screwed using the screws 16.

The rear-wheel drive and the freewheel clutch are sealed against the outside by the sealed bearings 5, 6 and 9. Further dynamic seals are not required.

To center radially the drive shaft 3 and the output shaft 4 of the rear-wheel shaft, the drive shaft 3 exhibits a centering face. The output shaft 4 likewise exhibits a centering face for the rear wheel 11.

The outside diameters of the drive shaft 3 and of the output shaft 4 of the rear-wheel shaft can be greater at the outside lying, not interconnected ends than, seen axially, at the level of the angular contact ball bearing 9.

In this way, for receiving the rear wheel 11 and for transmitting the weight forces and torques from the output shaft 4 of the rear-wheel shaft to the rear wheel 11 and in the opposite direction, many embodiments that are already known for one-sided running-wheel fastening mechanisms can be provided for the output shaft 4 in addition to the embodiment that has been shown.

Likewise it is possible to use a variety of shapes of rear wheels that are either screwed directly to the output shaft 4 of the rear-wheel shaft or can be connected to the output shaft 4 of the rear-wheel shaft by means of additional elements of the rear wheel 11.

In the exemplary embodiment of FIG. 1, screws 17 serve for fastening the bearing bushing 7 on the bicycle frame 8. Here again, a multiplicity of positive or releasable connections are possible between the bearing bushing 7 and the bicycle frame 8.

Figure 2:
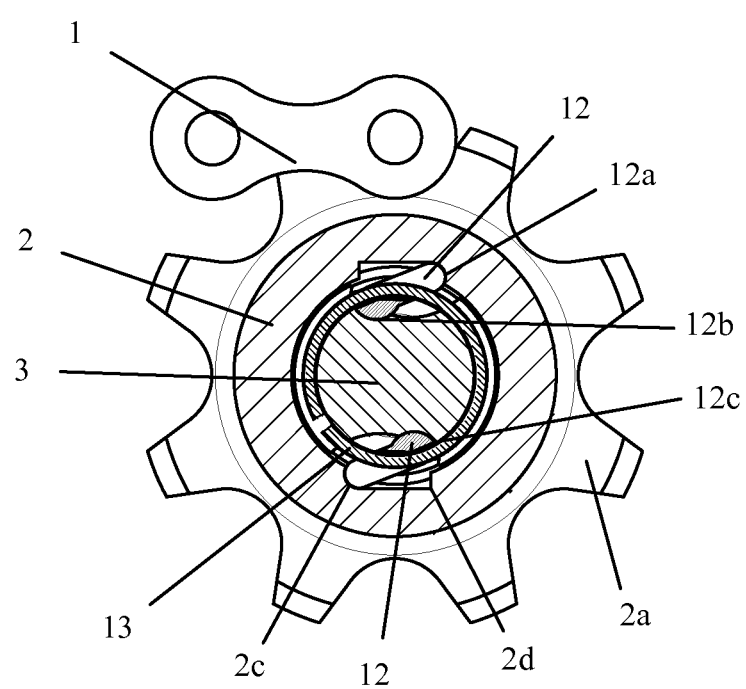
FIG. 2 shows the sectional view I-I through the driving mechanism and the freewheel clutch of FIG. 1 and the output sprocket having 8 teeth.

FIG. 2 shows the sectional view I-I through the driving mechanism 2 and the freewheel clutch as in FIG. 1.

The spring ring 13 of the freewheel clutch, that is arranged in a recess of the pawl 12 in the center of the pawl 12, biases the pawl 12 outward, whereby it is pressed with its rounding 12*a* that faces the driving mechanism 2, into the recess 2*c* of the driving mechanism 2. The pawl 12 exhibits at its end arranged toward the rear-wheel shaft, curves 12*b* that enable the required rotatability of the pawl 12 on the rear-wheel shaft. In addition, the pawl 12 exhibits an edge 12*c* that is pressed, in the coupling case, radially inward by the spring ring 13 or that presses the spring ring 13 radially outward in the freewheel case. This principle realizes the freewheel clutch: The spring ring 13 that is tensioned in the freewheel case, exerts a radially inwardly directed force on the edge 12*c* of the pawl 12. The pawl 12 rotates radially outward as soon as the driving mechanism that overtakes the rear-wheel shaft releases the corresponding radial space with its recess, whereby finally the curve 12*a* of the pawl is pressed into the recess 2*c* of the driving mechanism 2. When the rear-wheel shaft in the freewheel case overtakes the driving mechanism 2, the pawl 12 is again pressed radially inward by the driving mechanism 2, whereby the spring ring 13 is tensioned again. These principles are well known and are not detailed here any further.

Figure 3:
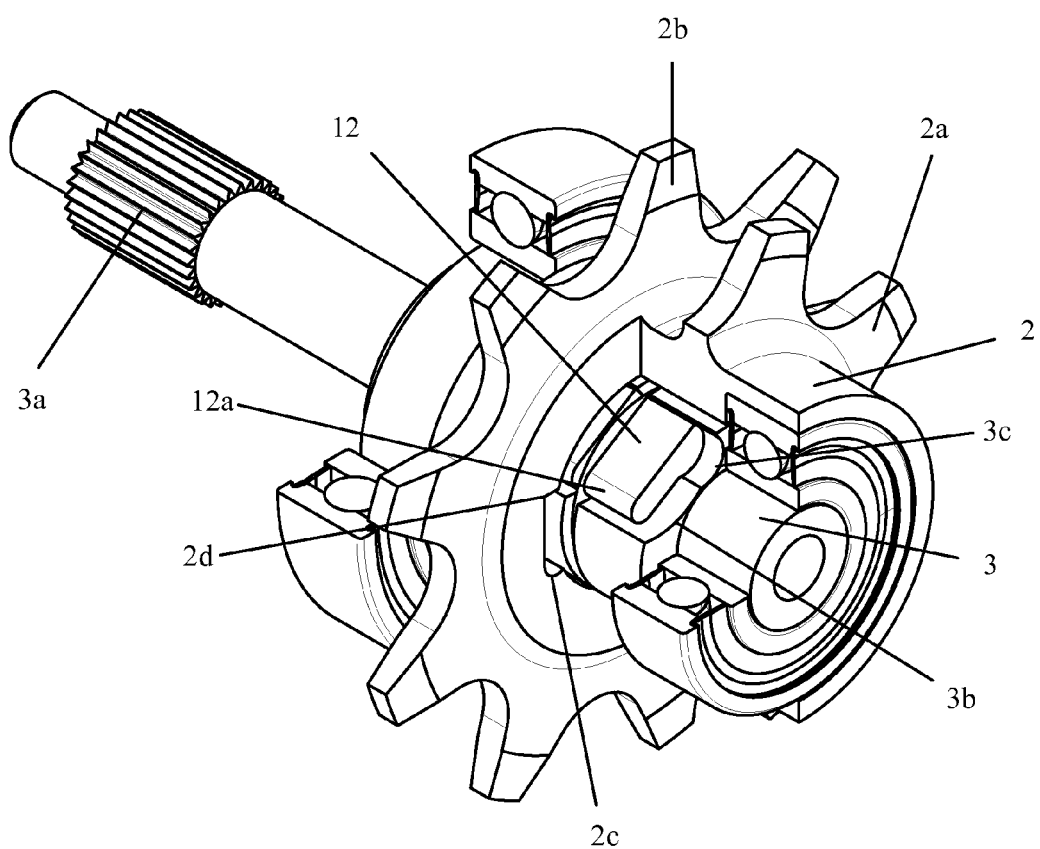
FIG. 3 shows a partial sectional view of the drive shaft of the rear-wheel shaft, of the driving mechanism comprising the output sprockets, and of the freewheel clutch as in FIG. 1.

As FIG. 2 shows, the output sprocket 2*a* only exhibits 8 teeth, while the output sprocket 2*b* exhibits 9 teeth, as FIG. 3 shows.

FIG. 3 shows a partial sectional view of the drive shaft 3 of the rear-wheel shaft, of the driving mechanism 2 that comprises the output sprockets 2*a* and 2*b*, and of the freewheel clutch in the freewheel as shown in FIG. 1.

As FIG. 3 shows only two half-round recesses 3*b* and 3*c* that can be milled by facing the end face are to be provided in the drive shaft 3 so as to accommodate the pawl 12 inside the diameter, that exists there, of the drive shaft 3 of the rear-wheel shaft in the freewheel case.

The driving mechanism 2 comprises on its hub side a rectangular recess 2*d* that is normal for parallel keys, the driving mechanism 2 in addition exhibiting on that side of the recess that is in contact with the pawl 12, the half-round millable recess 2*c* into which the rounding 12*a* of the pawl engages for force transmission.

Since the drive shaft 3 of the rear-wheel shaft and the driving mechanism 2 in each case exhibit half-round recesses 2*c* respectively 3*c* for guiding the pawls 12, the requirements in terms of the absolute positioning accuracy of these recesses 2*c* and 3*c* relative to the drive shaft 3 can be selected so as to be low, as long as a relatively high positional accuracy in terms of the recesses 2*c* and 3*c* exists between a plurality of similar half-round recesses 2*c* respectively 3*c*.

Figure 4:
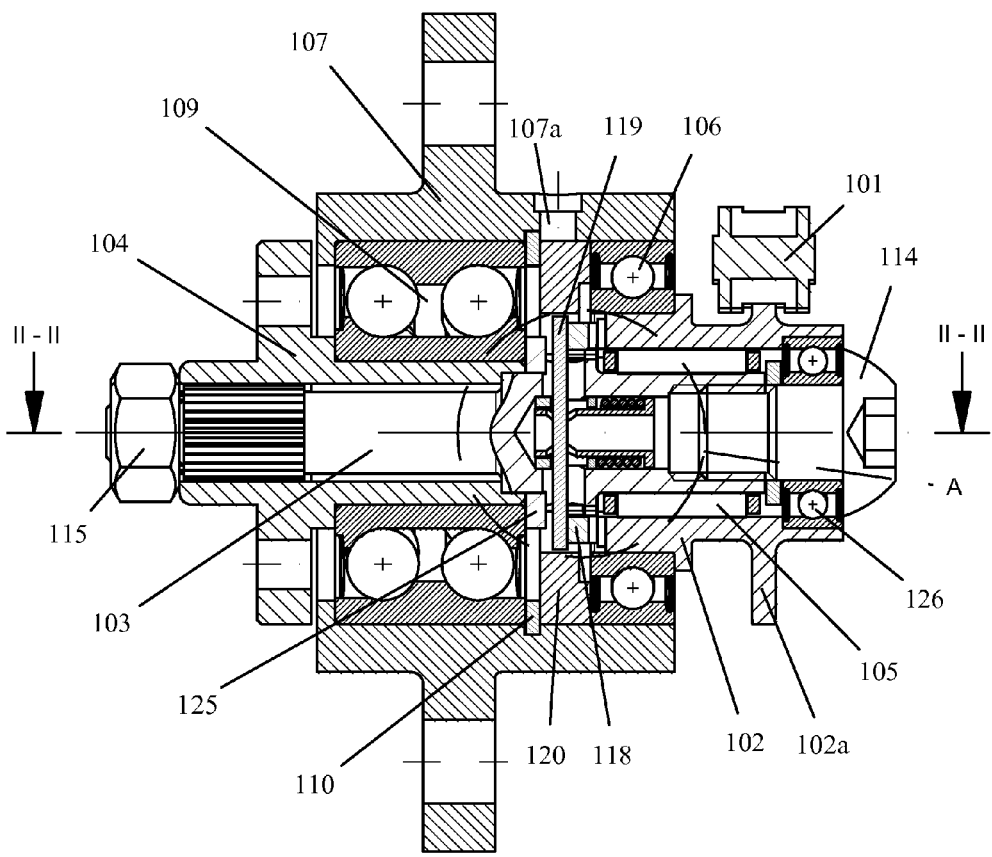
FIG. 4 shows the sectional view of a second embodiment of a rear-wheel drive in a one-armed suspension in the bicycle frame having a driving mechanism that exhibits an output sprocket having seven teeth, of an end-tooth freewheel clutch and a two-part rear-wheel shaft.
Figure 4:
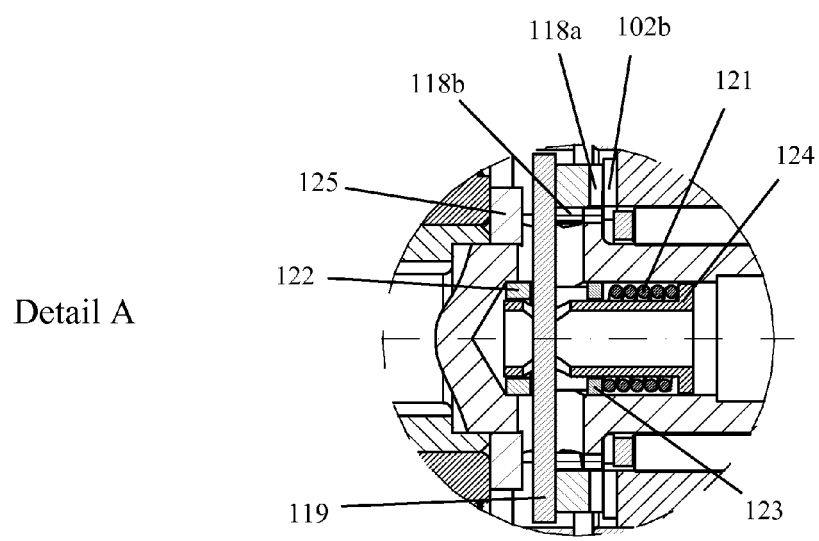

FIG. 4 shows a second embodiment of the rear-wheel drive.

For reasons of clarity, the parts of the rear-wheel drive in FIG. 4, that are described for FIG. 1 and are represented in FIG. 4 with a corresponding function, have been designated with a numeral that is increased by 100 in comparison to FIG. 1. The description of the parts in FIG. 1 is to be transferred for the corresponding parts in FIG. 4 to the extent that nothing to the contrary is described below.

In comparison to FIG. 1, the following features are modified:

a. As a freewheel clutch, an end-tooth connection is implemented between the driving mechanism 2 and a clutch member 118 that can slide axially, pushed by a pressure spring 121 and a pressure element 119, and an involute gearing is implemented between the clutch member 118 and the rear-wheel shaft.

b. The pressure mechanism for the clutch member 118 of the freewheel clutch enables the pressure spring 121 to be arranged on the side of the pressure element 119 facing the driving mechanism 102.

c. Seen radially, the driving mechanism 102 is supported on the rear-wheel shaft in the interior by means of a needle bearing 105. The bearing 126 lying on the outside only serves for fixing the driving mechanism 102 axially.

d. The driving mechanism 102 exhibits an output sprocket 102*a* having only seven teeth.

Re a. From the driving mechanism 102 that exhibits an output sprocket 102*a* having seven teeth, the torque is transmitted to the drive shaft 103 using a clutch member 118 that can be shifted axially and that is operatively co-rotatingly connected with the drive shaft 103 of the rear-wheel shaft. For this purpose, end teeth 118a are arranged on an end face of the clutch member 118 uniformly distributed on the circumference and can engage into corresponding recesses, in FIG. 4 into corresponding end teeth 102b, of the driving mechanism 102. It is likewise possible that only one clutch partner exhibits end teeth and the other clutch partner exhibits claws on its end face into which the end teeth of the one clutch partner can engage.

The end teeth 118a of the clutch member 118 are pressed axially into the end teeth 102b of the driving mechanism 102 by a pressure element 119 that penetrates the drive shaft 103 of the rear-wheel shaft at right angles to its axle and is arranged in corresponding radial opening of the drive shaft 103 of the rear-wheel shaft.

Seen radially, in involute gearing 118b is provided inside the clutch member 118, that transmits the torque from the clutch member 118 to the drive shaft 103.

An involute gearing 118b having the module 0.8 with 16 teeth according to DIN 5480 may be used for transmitting torque from the clutch member 118 to the drive shaft 103, as a result of which the tooth count can be divided by four and the base circle diameter is slightly larger than 12 mm and the head circle diameter is slightly smaller than 14 mm. In contrast, eight end teeth 118a, and thus again a tooth count that can be divided by four, is provided for the end gearing of the clutch member 118. This symmetry that is achieved using the tooth counts that can be divided by four permits simple manufacture of the clutch member 118 and of the driving mechanism 102.

The clutch member 118 of the freewheel clutch exhibits the following design that is particularly space-saving: At an end face, the clutch member 118 exhibits an end toothing having the end teeth 118, and the clutch member 118 exhibits no recesses for receiving and guiding the pressure element 119. The pressure element 119 can be designed as a rectangle and without further recesses. Apart from a pressure element, also round pressure rods or flattened pressure rods can be used. A disk 120 that keeps the pressure element 119 in position is arranged axially between the retaining ring 110 and the bearing 106 that supports, seen radially, the driving mechanism 102 on the inside.

As a result of the arrangement of the elements of the rear-wheel drive, the required fixed fits can be provided between the angular contact ball bearing 109 and the output shaft 104 of the rear-wheel shaft and also between the angular contact ball bearing 109 and the bearing bushing 107.

Figure 5:
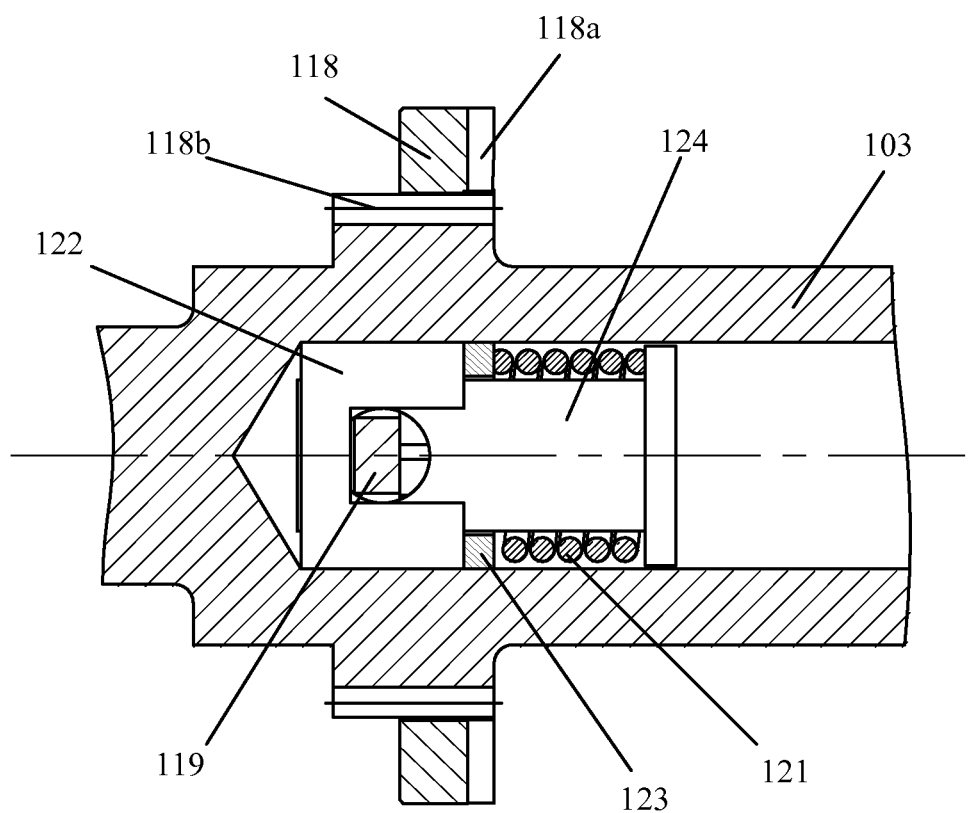
FIG. 5 shows a partial sectional view II-II of the freewheel clutch as in FIG. 4 showing the components pressure element, pressure spring, pressure sleeve, and guide bushing.

Re b. Since an end toothing is used as clutch between the driving mechanism 102 and the clutch member 118, the clutch member 118 has to be moved axially against the driving mechanism 102. This takes place by means of the pressure element 119 via a pressure spring 121 arranged inside the rear-wheel shaft, according to the mechanism described below:

Since, as in FIG. 1, a two-part rear-wheel shaft is used that consists of the drive shaft 103 and the output shaft 104 that are interconnected, no sufficient radial installation space exists inside the rear-wheel shaft for the pressure spring 121 of the freewheel clutch in FIG. 4, seen axially, between the pressure element 119 and the angular contact ball bearing 109. The pressure spring 121 having the arrangement described below is arranged on the side of the pressure element 119 facing the driving mechanism 102. In FIG. 5, the elements described below of the freewheel clutch are illustrated in the part-sectional view II-II of FIG. 4. A pressure sleeve 122 having two legs, that is supported in the drive shaft 103, is kept at a distance from the pressure element 119 by a washer 123. The pressure spring 121 is supported on the washer 123 and it again exerts an axial force on a guide bushing 124. The guide bushing 124 exhibits a continuous recess, preferably a bore, in which the pressure element 119 is accommodated. The guide bushing 124 guides the pressure force of the pressure spring 121, seen radially, inside the pressure spring 121 and inside the pressure sleeve 122 again onto the axially seen other side of the pressure element 119. Via the bore of the guide bushing 124, the pressure element 119 is finally pressed against the clutch member 118. In the freewheel case, the end teeth 102b of the driving mechanism 102 press the end teeth 118 of the clutch member 118 out of the end-tooth connection. In this case, the pressure spring 121 is pressed by the guide bushing 124 against the washer 123 that is supported on the pressure sleeve 122 and on the drive shaft 103. The design of the freewheel clutch having the features described above enables a freewheel clutch that is particularly space-saving, that can transmit high torque values. Instead of a contact shoulder, that is present on the drive shaft side, for the angular contact ball bearing, a washer 125 serves as contact shoulder for the angular contact ball bearing 109. The bearing bushing 107 exhibits a bore 107a that can be closed using a plug, a screw or the like, that makes it possible to install and remove the pressure element 119 and thus the entire freewheel clutch without having to separate the bicycle frame, the bearing bushing 107, the angular contact ball bearing 109, the drive shaft 103 and the output shaft 104 from each other. In this way, the drive shaft 103 can also be positively connected to the output shaft 104, for example by soldering.

c. Seen radially, the driving mechanism 102 is supported on the inside by a needle bearing 105 on the drive shaft 103 of the rear-wheel shaft. The needle bearing 105 absorbs the loads of the cyclist due to the weight that act, when the rear wheel 111 is blocked, via the pedals onto the drive chain wheel, the chain and finally onto the output sprocket 102a and the driving mechanism 102. A bearing 126 lying outside now only serves for axially fixing the driving mechanism 102 and can therefore be designed with a particularly small outside diameter. Seen radially on the inside, the bearing 126 is supported on a fixing screw 114 that is screwed into the drive shaft 103. The radial positioning of the bearing 126 should take place with clearance between the fixing screw 114 and the drive shaft 103. Seen radially, it is likewise possible to provide additional seal elements between the fixing screw 114 and the bearing 126 and/or between the bearing 126 and the driving mechanism 102.

d. Due to the use of the needle bearing 105 for supporting the driving mechanism 102 and due to the small outside diameter of the bearing 126, the output sprocket exhibits only seven teeth.

FIG. 5 shows the partial sectional view II-II of the freewheel clutch as in FIG. 4 having the pressure element 119, the pressure spring 121 arranged inside the drive shaft 103, the pressure sleeve 122, and the guide bushing 124.

Figure 6:
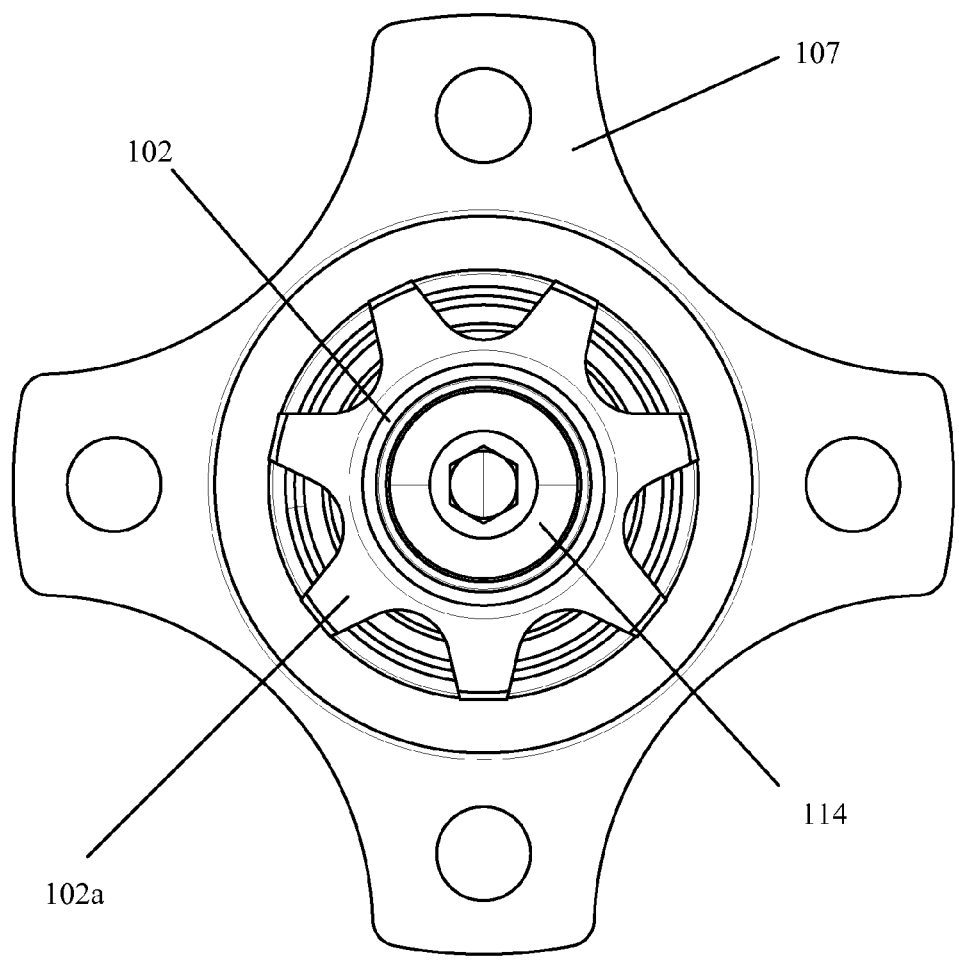
FIG. 6 represents the corresponding side view of the rear-wheel drive as in FIG. 4.

FIG. 6 represents the corresponding side view of the rear-wheel drive as in FIG. 4 having the driving mechanism 102 that exhibits the output sprocket 102a having seven teeth.

Figure 7:
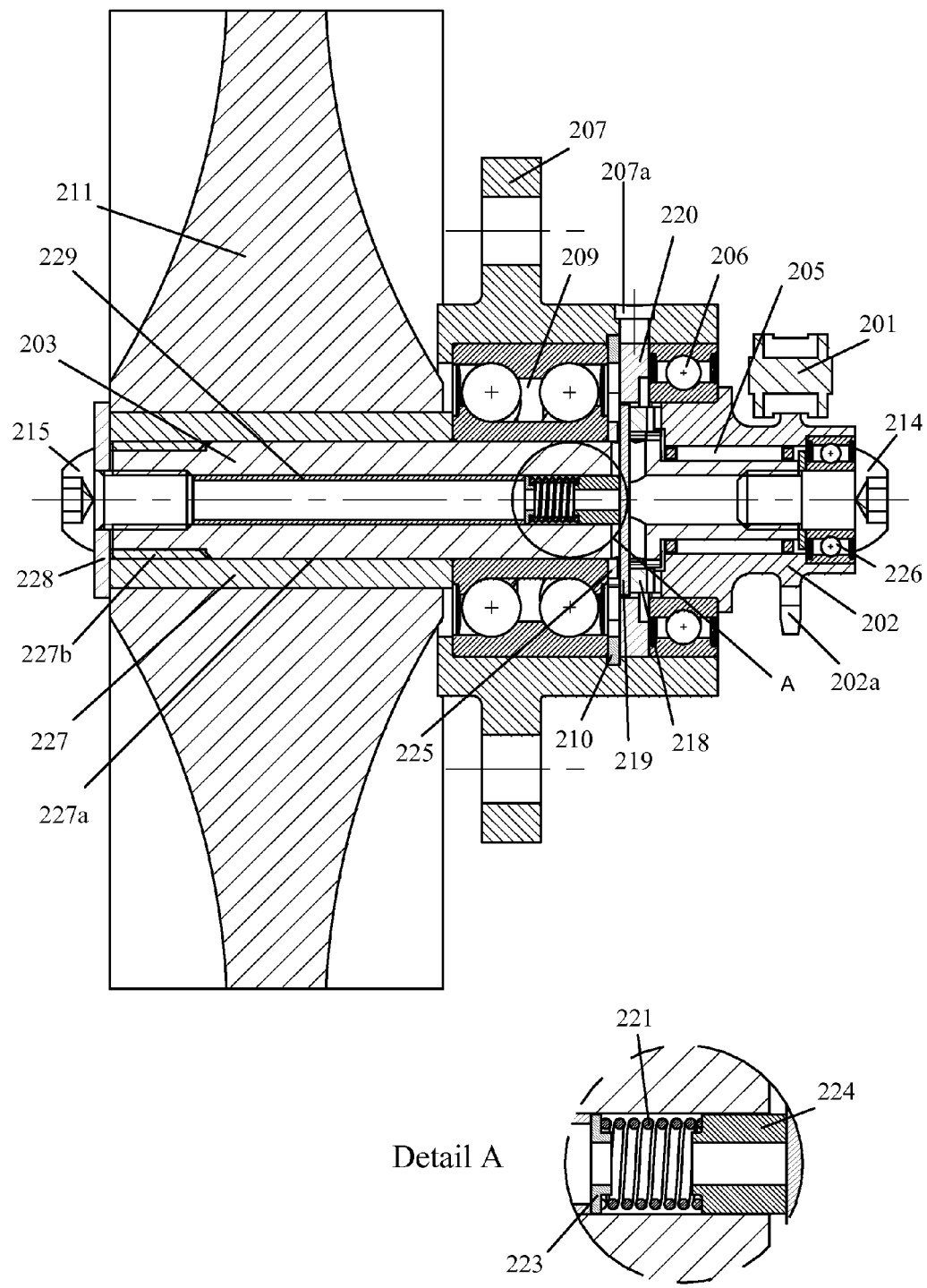
FIG. 7 shows a third embodiment of a rear-wheel drive having a driving mechanism that exhibits an output sprocket having six teeth, of an end-tooth freewheel clutch, of an undivided rear-wheel shaft on which a solid 10 inch plastic running wheel is fastened.

FIG. 7 shows a third exemplary embodiment of a rear-wheel drive.

For reasons of clarity the parts of the rear-wheel drive that are described with reference to FIG. 4 and are represented in FIG. 7 with a corresponding function, have been designated with a numeral that is increased by 100 in comparison to FIG. 4. The description of the parts in FIG. 1 respectively FIG. 4 is to be transferred for the corresponding parts in FIG. 7 to the extent that nothing to the contrary is described below.

In comparison to FIG. 4, the following features are modified:

a. The rear-wheel shaft 203 is designed such that it is undivided. The inside diameter of the angular contact ball bearing 209 is at least as large as the seat of the rear wheel 211 on the rear-wheel shaft 203, so that the angular contact ball bearing 209 can be installed and removed.

b. The rear wheel is connected to the rear-wheel shaft 203 by means of a threaded sleeve 227 that is designed as a rear-wheel hub. Seen axially between the angular contact ball bearing 209 and the involute gearing of the rear-wheel shaft 203, the washer 225 that can also be designed as a retaining ring serves as the contact shoulder on the shaft side for the angular contact ball bearing 209. The rear wheel 211 that seen radially exhibits a threaded sleeve 227 on the inside, is screwed onto the rear-wheel shaft 203 and presses the angular contact ball bearing 209 on the rear-wheel shaft 203 against the washer 225 for the purpose of axially fixing the angular contact ball bearing 209. By suitably choosing the fit, a fit section 227a of the threaded sleeve 227 is firmly connected to the rear-wheel shaft 203 by means of a fixed fit and carries the loads that are caused by the weight and the road surface. The torque is transmitted between the rear-wheel shaft 203 and the rear wheel 211 essentially by means of the threaded section 227b of the threaded sleeve 227. The threaded sleeve 227 that supports the rear wheel 211 is locked by means of a screw 215 and a washer 228.

c. The pressure spring 221 that shifts the clutch member 218 toward the driving mechanism 202 is arranged on the side of the pressure element 219 facing the rear wheel 211. On account of the single-part design of the rear-wheel shaft 203, there is created inside the rear-wheel shaft 203 space for arranging the pressure spring 221 on the side of the pressure element 219 facing the angular contact ball bearing 209. The pressure spring 221 presses the guide bushing 224 against the pressure element 219 and the latter against the clutch member 218 and the driving mechanism 202. The pressure spring 221 is supported on the screw 215 via the washer 223 and a guide tube 229.

d. The driving mechanism 202 exhibits an output sprocket 202a having only six teeth. In comparison to the exemplary embodiment from FIG. 4, in the exemplary embodiment illustrated in FIG. 7 another smaller needle bearing 205 having an inside diameter of 8 mm and having an outside diameter of 11 mm is designed for supporting the driving mechanism 202 on the rear-wheel shaft 203. In a similar manner, the bearing 226 is designed to be smaller, to be precise having an inside diameter of 6 mm and an outside diameter of 13 mm. This exemplary embodiment thereby enables the implementation of a driving mechanism 202 that exhibits an output sprocket 202a having only six teeth.

e. On account of the small gear ratio of the chain drive, that can be achieved using an output sprocket 202a having six teeth, it is even a solid plastic running wheel having a size of only 10 inch that is used. It would even be possible to use a running wheel having a size of 8 inch in the case of a sufficiently large drive chain wheel.

Figure 8:
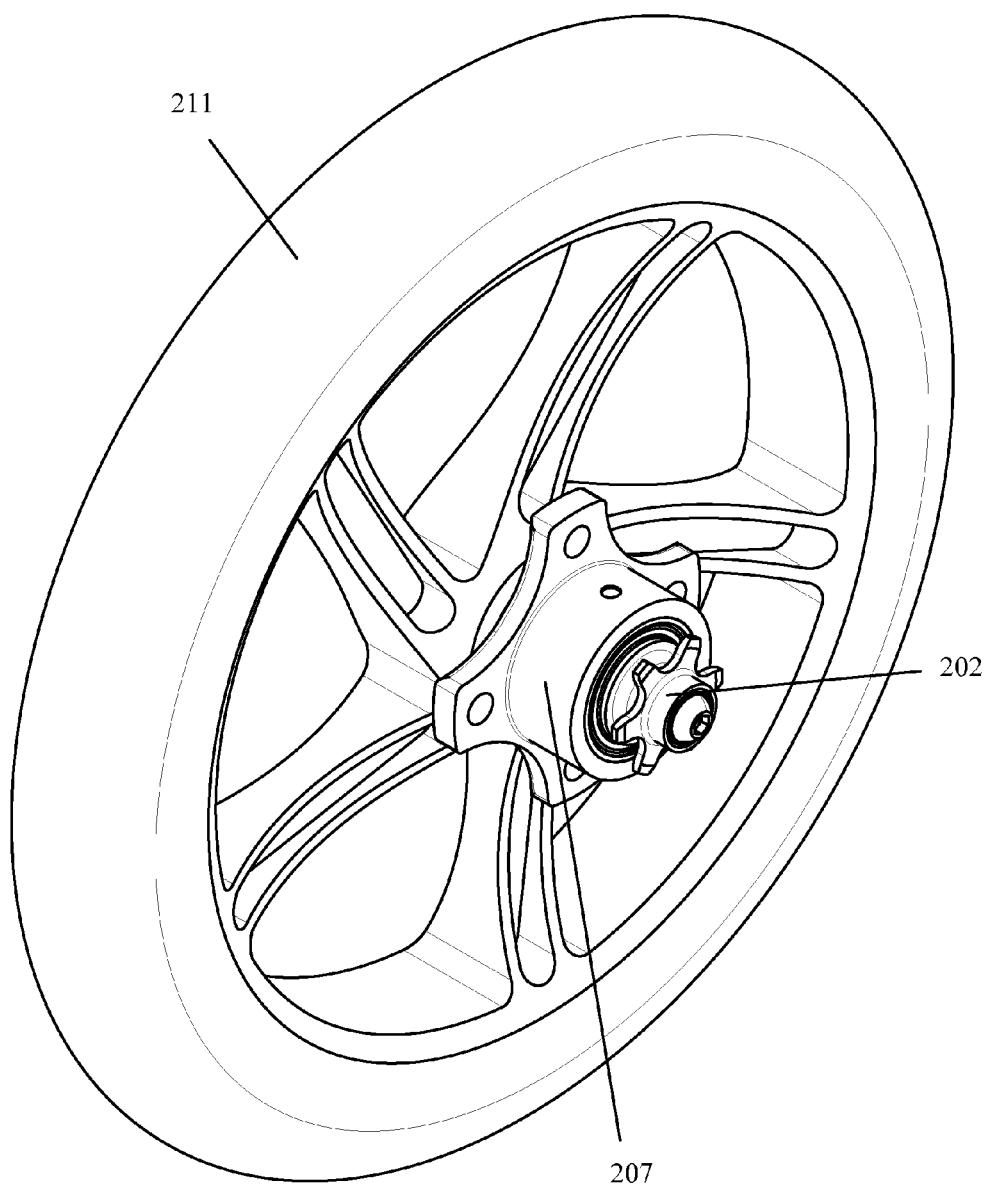
FIG. 8 shows a view of the rear-wheel drive as in FIG. 7 having the output sprocket that exhibits six teeth.

FIG. 8 shows a view of the rear-wheel drive from FIG. 7 having the output sprocket 202a that exhibits six teeth.

Figure 9:
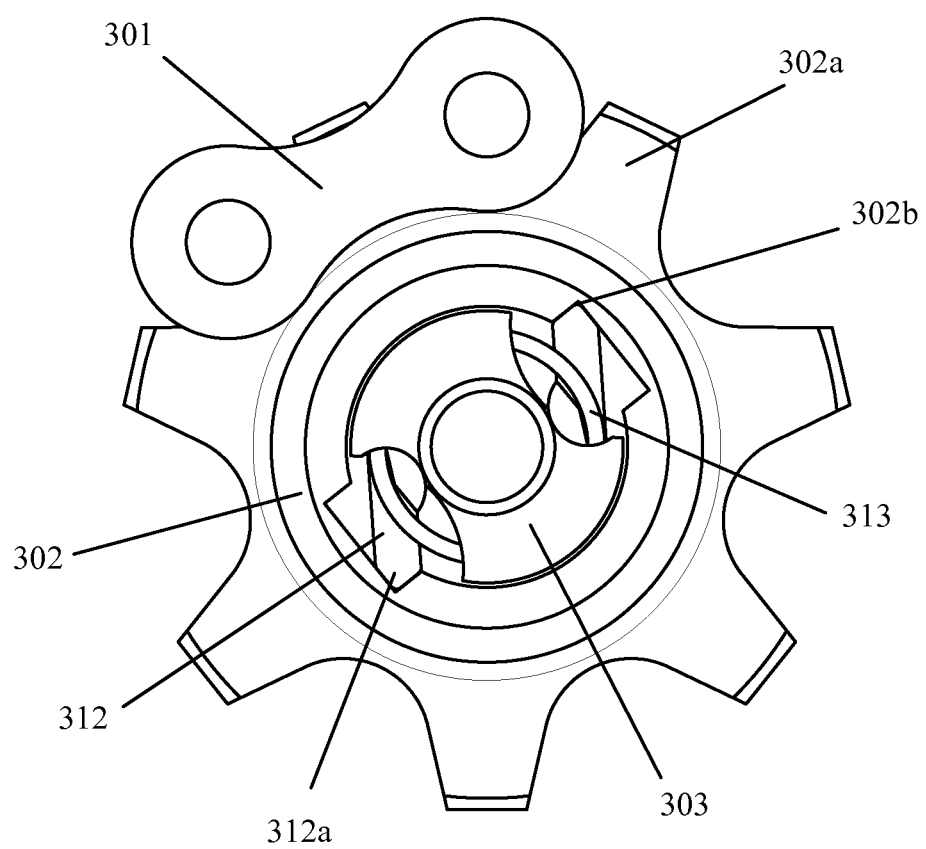
FIG. 9 shows in the side view a forth embodiment of a rear-wheel drive having a pawl freewheel clutch, the output sprocket exhibiting only seven teeth.

In a side view, FIG. 9 shows a fourth embodiment of the rear-wheel drive having a pawl freewheel clutch, the output sprocket 302a exhibiting only seven teeth. To comply with increased strength requirements, the width of the pawl 312 in this case corresponds to the entire length of the rear-wheel shaft 303 that is available between the two bearings that support the driving mechanism 302. On top of this, FIG. 9 shows a further embodiment of the pawls 312 for the pawl freewheel. The pawl 312 exhibits a flattened, rectangular tip 312a that engages into a hub-side rectangular recess 302b of the driving mechanism 302. The choice of the diameter makes it possible, even for this embodiment, to use an output sprocket 302a having only seven teeth.

Figure 10:
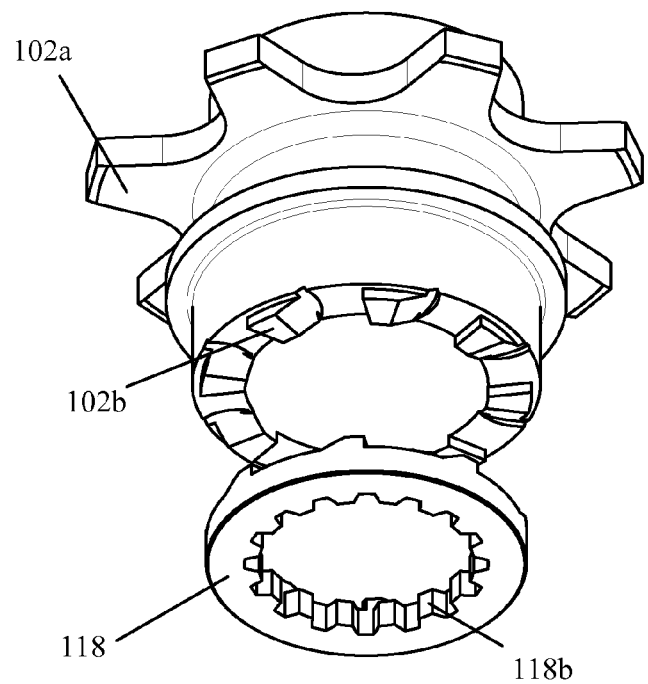
FIG. 10 to FIG. 12 show further embodiments of the end toothing of clutch member and driving mechanism for the embodiments as in FIG. 4 and FIG. 7.
Figure 10:
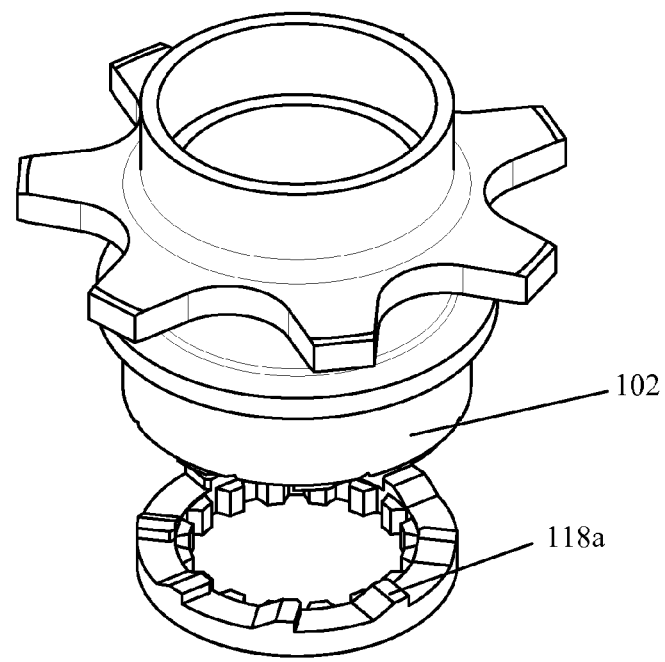
Figure 11:
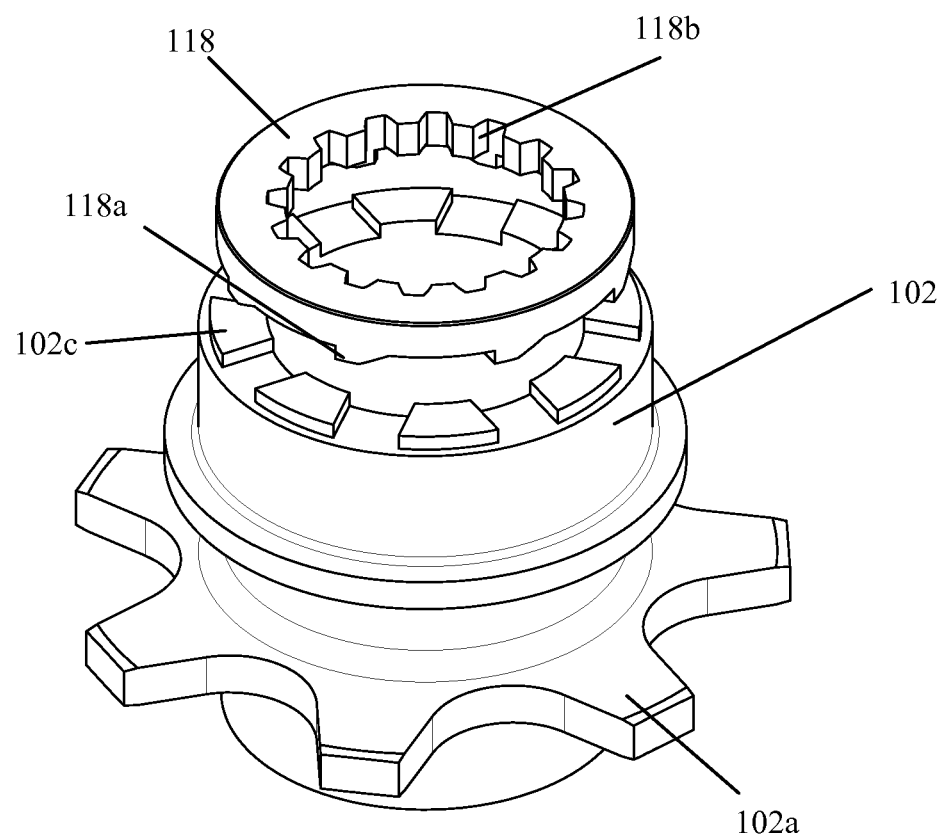
Figure 12:
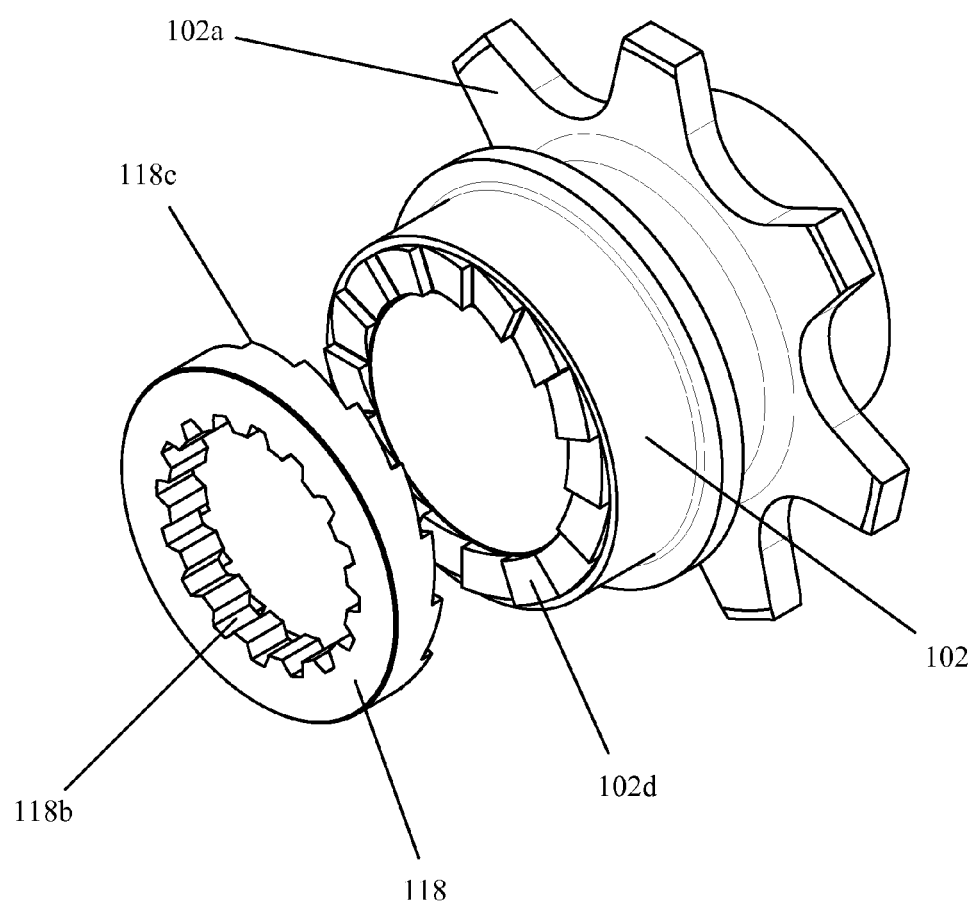

FIG. 10 to FIG. 12 show further possible embodiments of the end toothing of the clutch member 118 and the driving mechanism 102 for the exemplary embodiments from FIG. 4 and FIG. 7 in the exploded view, the designations referring to FIG. 4.

FIG. 10 shows an embodiment where the clutch member 118 and the driving mechanism 102 in each case exhibit an eight-teeth millable end gearing.

In FIG. 11 it is only one clutch partner, in this case the clutch member 118, that exhibits the eight millable end teeth 118, while the other clutch partner, in this case the driving mechanism 102, exhibits millable claws 102c into which the end teeth 118a of the clutch member 118 engage.

In FIG. 12, both clutch partners, clutch member 118 and driving mechanism 102, exhibit a modified end toothing having end teeth 118c and 102d that are uniformly arranged next to each other on the circumference and mesh.

Figure 13:
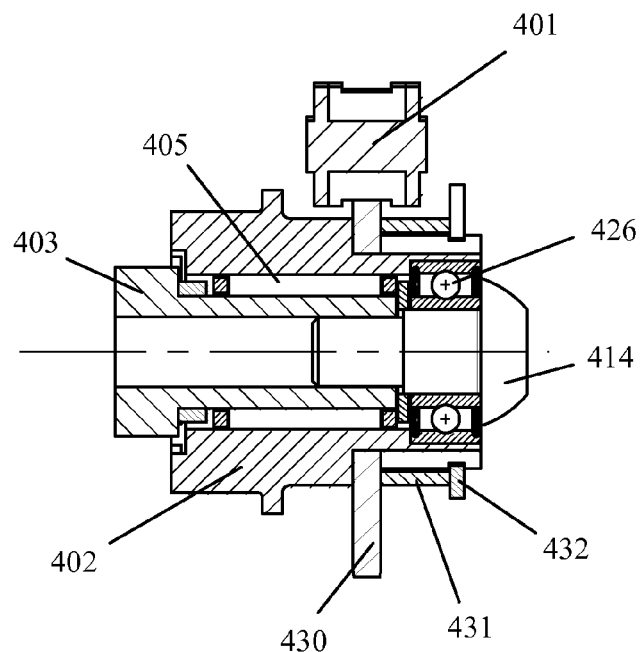
FIG. 13 shows a sectional view and a view of the driving mechanism and of the freewheel clutch of a further embodiment, the output sprocket being co-rotatingly connected with, but releasably to the driving mechanism and exhibiting only seven teeth.
Figure 13:
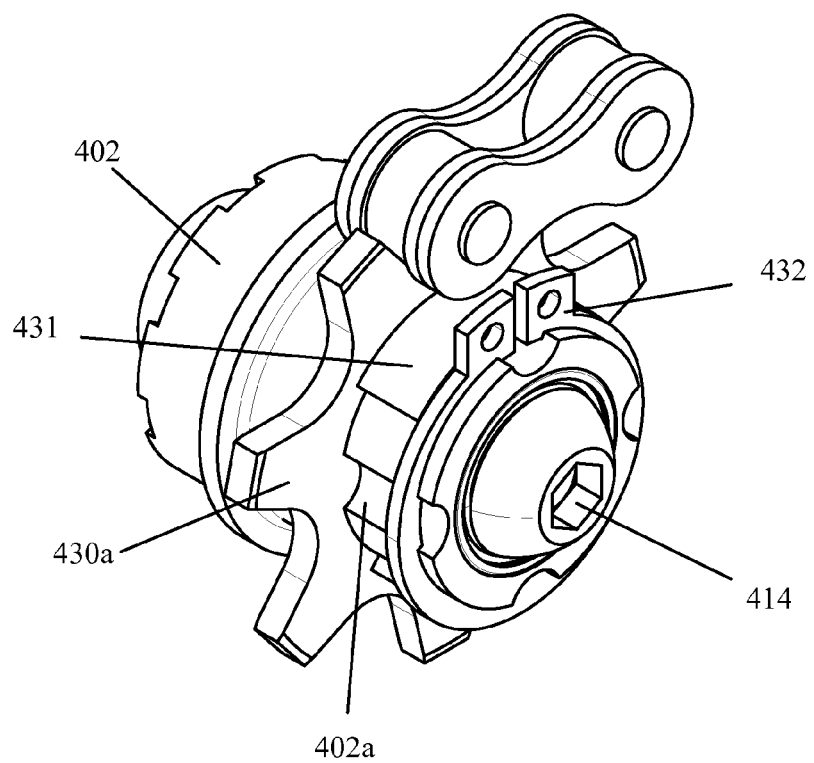

FIG. 13 shows a sectional view and a view of a driving member 402 on which co-rotatingly connected with, but releasably, an output sprocket 430 having only seven teeth 430a can be fastened. For axially fixing the driving mechanism 402, an angular ball bearing 426 having an outside diameter of 13 mm can be used. The radial loads are taken up by a needle bearing 405 having an outside diameter of 11 mm. Seen axially relative to the bicycle frame, the output sprocket 430 is defined against a contact shoulder of the driving mechanism 402, while axial fixation takes place from the outside by means of a distance sleeve 431 through a retaining ring 432. As is sufficiently known for output sprockets, the torque is transmitted from the output sprocket 430 via a round recess 402a to the driving mechanism 402. Other embodiments of the releasable connection between the output sprocket 430 and the driving mechanism 402 can be imagined, but are not detailed here separately. Finally this exemplary embodiment, too, reveals that the smallest possible output sprockets 2a, 2b, 102a, 202a, 302a, 430 can be implemented for the chain drive of the bicycle.

In all exemplary embodiments described above it is likewise possible to implement output sprockets having more teeth than mentioned in the respective exemplary embodiment.

Using the embodiments mentioned above, the gear ratios described in more detail in an exemplary manner below can be implemented.

Since the resulting gear ratios produce very small numbers, the illustration of the gear ratios has been selected to be in the format of a prefixed ratio "1:". The respective row for the gear ratio that has been shown of the respective chain drive then lists the divisor of the gear ratio of 1:. For example a gear ratio of 0.125 is for example illustrated as =1:8.

TABLE A

Exemplary gear ratios for small running wheels

| Running Wheel Size in Inch | Tooth Count Drive Chain Wheel | Tooth Count Output Sprocket | Gear Ratio = 1: | Development in m/crank arm revolution |
|---|---|---|---|---|
| 8 | 48 | 6 | 8.00 | 5.3 |
| 8 | 48 | 7 | 6.86 | 4.6 |
| 10 | 40 | 6 | 6.67 | 5.3 |
| 10 | 40 | 7 | 5.71 | 4.6 |

TABLE A-continued

Exemplary gear ratios for small running wheels

| Running Wheel Size in Inch | Tooth Count Drive Chain Wheel | Tooth Count Output Sprocket | Gear Ratio = 1: | Development in m/crank arm revolution |
|---|---|---|---|---|
| 12 | 36 | 6 | 6.00 | 5.4 |
| 12 | 36 | 7 | 5.14 | 4.6 |
| 10 | 52 | 8 | 6.50 | 5.2 |
| 10 | 52 | 9 | 5.78 | 4.6 |
| 12 | 48 | 8 | 6.00 | 5.4 |
| 12 | 48 | 9 | 5.33 | 4.8 |
| 14 | 40 | 8 | 5.00 | 5.4 |
| 14 | 40 | 9 | 4.44 | 4.8 |
| 16 | 36 | 8 | 4.50 | 5.4 |
| 16 | 36 | 9 | 4.00 | 4.8 |
| 10 | 48 | 7 | 6.86 | 5.5 |
| 12 | 48 | 8 | 6.00 | 5.4 |
| 14 | 48 | 10 | 4.80 | 5.1 |
| 16 | 48 | 11 | 4.36 | 5.2 |

The table above reveals in the upper part the advantages of the embodiment from FIG. 1 having a plurality of output sprockets. The output sprocket 2a, 2b that is used can be selected by a simple change of the position of the chain (e.g. in FIG. 1 on the output sprocket 2a having eight respectively 2b having nine teeth), so that the desired development for the bicycle can be set. On top of this, the table above reveals that with an identical achievable development, the same rear-wheel drive can be adapted to all running wheel sizes of 10 inch up to 16 inch, by simply using another commercially available drive chain wheel. In this way, the same rear-wheel drive can be used for a multiplicity of possible embodiments of bicycles (having solid plastic running wheels, having air-filled running wheels and so on).

The table above shows in the lower part that the same rear-wheel drive and the same drive chain wheel can be used with the same achievable development for different running-wheel sizes of 10 inch to 16 inch, by simply exchanging the output sprocket that is designed so as to be releasable in the exemplary embodiment of FIG. 13.

As an example, a possible embodiment is illustrated below as multi-speed derailleur having six gears, the rear-wheel drive exhibiting the two output sprockets shown in FIG. 1. The multi-speed derailleur is implemented using a commercially available drive chain wheel having the chain counts 42-32-24 since in this way gradations of similar size can be achieved between the gears.

TABLE B

Six-speed transmission for a 16 inch wheel

| Running Wheel Size in Inch | Gear | Tooth Count Drive Chain Wheel | Tooth Count Output Sprocket | Gear Ratio 1: | Development in m/crank arm revolution | Gradation |
|---|---|---|---|---|---|---|
| 16 | 1 | 24 | 9 | 2.67 | 3.2 | |
| 16 | 2 | 24 | 8 | 3.00 | 3.6 | 12.5% |
| 16 | 3 | 32 | 9 | 3.56 | 4.3 | 18.5% |
| 16 | 4 | 32 | 8 | 4.00 | 4.8 | 12.5% |
| 16 | 5 | 42 | 9 | 4.67 | 5.6 | 16.7% |
| 16 | 6 | 42 | 8 | 5.25 | 6.3 | 12.5% |

In case a technology is available that is able to change gears even in the case of particularly low tooth counts of the output sprockets, there are illustrated below further possible embodiments as multi-speed gear having six gears and a uniform gear gradation for the running wheel sizes 14 inch and 12 inch. Even in this case, the rear-wheel drive exhibits two output sprockets:

TABLE C

Six-Speed Transmission for 14 inch Wheel and for 12 inch Wheel

| Running Wheel Size in Inch | Gear | Tooth Count Drive Chain Wheel | Tooth Count Output Sprocket | Gear Ratio = 1: | Development in m/crank arm revolution | Gradation |
|---|---|---|---|---|---|---|
| 14 | 1 | 24 | 8 | 3.00 | 3.2 | |
| 14 | 2 | 24 | 7 | 3.43 | 3.7 | 14.3% |
| 14 | 3 | 32 | 8 | 4.00 | 4.3 | 16.7% |
| 14 | 4 | 32 | 7 | 4.57 | 4.9 | 14.3% |
| 14 | 5 | 42 | 8 | 5.25 | 5.6 | 14.8% |
| 14 | 6 | 42 | 7 | 6.00 | 6.4 | 14.3% |
| 12 | 1 | 24 | 7 | 3.43 | 3.09 | |
| 12 | 2 | 24 | 6 | 4.00 | 3.60 | 16.7% |
| 12 | 3 | 32 | 7 | 4.57 | 4.11 | 14.3% |
| 12 | 4 | 32 | 6 | 5.33 | 4.80 | 16.7% |
| 12 | 5 | 42 | 7 | 6.00 | 5.40 | 12.5% |
| 12 | 6 | 42 | 6 | 7.00 | 6.30 | 16.7% |

In addition, using the features that have been described above or the features that are claimed below, a multiplicity of further gear ratios can be realized.

All tooth counts, mentioned below in the patent claims, of output sprockets and drive chain wheels refer to the chain pitch of 12.7 mm that is conventional for bicycle chains. For embodiments having chain pitches that deviate therefrom, those tooth counts are claimed in the respective claims that result from the rounded result of the multiplication of the tooth counts respectively listed below by the quotient of 12.7 mm divided by the deviating chain pitch.

The invention claimed is:

1. A rear-wheel drive for a bicycle or a trailer bike, comprising:
   at least one output sprocket (2a, 2b, 102a, 202a, 302a, 430) of a chain drive;
   a rear-wheel shaft (3, 4; 103, 104; 203, 303, 403);
   a driving mechanism (2, 102, 202, 302, 402), co-rotatingly connected with the output sprocket (2a, 2b; 102a, 202a, 302a, 430), the driving mechanism (2, 102, 202, 302, 402) being rotatably connected by a first drive mechanism bearing (5, 105, 205) to the rear-wheel shaft (3, 4; 103, 104; 203, 303, 403) and rotatably connected by a second drive mechanism bearing (6, 106, 206) to a bicycle frame (8),
   at least one rear-wheel shaft bearing (9, 109, 209) rotatably connecting the rear-wheel shaft (3, 4; 103, 104; 203, 303, 403) to the bicycle frame (8), the rear-wheel shaft bearing (9, 109, 209) being arranged on the rear-wheel shaft (3, 4; 103, 104; 203, 303, 403) axially between the driving mechanism (2, 102, 202, 302, 402) and a seat of a rear wheel (11, 211), the at least one rear-wheel shaft bearing (9, 109, 209) being arranged between the rear-wheel shaft (3, 4; 103, 104; 203, 303, 403) radially inwardly thereof and the bicycle frame (8) radially outwardly thereof; and
   a freewheel clutch for transferring torque from the driving mechanism (2, 102, 202, 302, 402) to the rear-wheel shaft (3, 4; 103, 104; 203, 303, 403),
   wherein the rear-wheel shaft (3, 4; 103, 104; 203, 303, 403) is supported on only one side of the driving mechanism (2, 102, 202, 302, 402) relative to the bicycle frame (8).

2. The rear-wheel drive as in claim 1,
wherein the rear-wheel shaft (3, 4; 103, 104) comprises a drive shaft (3, 103) co-rotatingly connected to an output shaft (4, 104).

3. The rear-wheel drive as in claim 2,
further comprising a bearing bushing (7, 107, 207) which is firmly connected to the bicycle frame (8)
wherein the rear-wheel shaft bearing (9, 109, 209) and the second drive mechanism bearing (6, 106, 206) are arranged within the bearing bushing (7, 107, 207).

4. The rear-wheel drive as in claim 1,
wherein the freewheel clutch is a pawl freewheel, comprising:
at least one rotatable pawl (12, 312) arranged in a recess (3b, 3c) of the rear-wheel shaft (303), and
a circular spring (13, 313) for biasing the pawl (12, 312) outward.

5. The rear-wheel drive as in claim 4,
wherein an inner radius of the first drive mechanism bearing (5) is smaller than a radial extension from the center of the rear-wheel shaft (303) to the recess (3b, 3c).

6. The rear-wheel drive as in claim 1,
wherein the freewheel clutch comprises a clutch member (118, 218) that is co-rotatingly connected with the rear-wheel shaft (203) and can slide axially on the rear-wheel shaft (203).

7. The rear-wheel drive as in claim 6,
wherein the clutch member (118, 218) comprises teeth (118a) which are uniformly distributed along a circumference of a clutch member surface facing the driving mechanism (102, 202).

8. The rear-wheel drive as in claim 6,
wherein the clutch member (118, 218) is co-rotatingly connected with the rear-wheel shaft (203) by an involute gearing (118b).

9. The rear-wheel drive as in claim 8,
wherein the clutch member (118, 218) is co-rotatingly connected with the rear-wheel shaft (203) by a 16-tooth involute gearing (118b) having a module 0.8.

10. The rear-wheel drive as in claim 6, further comprising:
a pressure element (119, 219) arranged perpendicular to a longitudinal axis of the rear-wheel shaft (203) and extending through a corresponding radial opening which penetrates the rear-wheel shaft (203); and
a pressure spring (121, 221) arranged inside a hollow-cylindrical portion of the rear-wheel shaft (203),
wherein the pressure element (119, 219) is in contact with the clutch member (118, 218) and with the pressure spring (121, 221), and
wherein the pressure element (119, 219) pushes the clutch member (118, 218) axially along the rear-wheel shaft (203) towards the driving mechanism (2, 202).

11. The rear-wheel drive as in claim 10,
wherein the radial opening which penetrates the rear-wheel shaft (203) is a continuous bore.

12. The rear-wheel drive as in claim 10,
wherein the pressure element (119, 219) is held laterally by a disk (120, 220) which is disposed between the at least one rear-wheel shaft bearing (9, 109, 209) and the second drive mechanism bearing (6, 106, 206).

13. The rear-wheel drive as in claim 10,
further comprising a pressure sleeve (122) disposed within the hollow-cylindrical portion of the rear-wheel shaft (103) on both sides of the pressure element (119, 219),
wherein a first end of the pressure sleeve (122) which faces the rear-wheel is supported by the rear-wheel shaft (103) and an opposite second end of the pressure sleeve (122) which faces the driving mechanism (102) engages a first end of the pressure spring (121) at a distance from the pressure element (119), and
wherein a guide bushing (124) is disposed within the hollow-cylindrical portion of the rear-wheel shaft (103) in contact with a second end of the pressure spring (121), the guide bushing (124) comprising a recess for pushing the pressure element (119) against the clutch member (118) toward the driving mechanism (102).

14. The rear-wheel drive as in claim 10,
wherein the bicycle frame, the bearing bushing (107), the rear-wheel shaft (103, 104), and the bearing (109) are interconnected while the pressure element (119) can be installed or removed.

15. The rear-wheel drive as in claim 1,
wherein an outer diameter of the drive shaft (3, 103) and an outer diameter of the output shaft (4, 104) are each larger than an inner diameter of the rear-wheel shaft bearing (9, 109, 209).

16. The rear-wheel drive as in claim 15,
wherein the output shaft (4, 104) comprises a rear-wheel flange to which the rear wheel (11) can be fastened.

* * * * *